March 8, 1938.  J. I. BELLAMY  2,110,192
SIGNALING SYSTEM
Filed April 22, 1935  2 Sheets-Sheet 1

John I. Bellamy
Inventor

March 8, 1938.  J. I. BELLAMY  2,110,192
SIGNALING SYSTEM
Filed April 22, 1935  2 Sheets-Sheet 2

John J. Bellamy
Inventor

Patented Mar. 8, 1938

2,110,192

UNITED STATES PATENT OFFICE 2,110,192

SIGNALING SYSTEM

John I. Bellamy, Brookfield, Ill.

Application April 22, 1935, Serial No. 17,647

6 Claims. (Cl. 177—311)

My invention relates to signaling systems. Its object is to provide a simple and reliable system for signaling an attendant when the temperature rises above or falls below a given point. It may be of utility in, for example, a home heated by a central heating plant, or in a cold-storage room such as is provided at markets and the like for the storage of perishable foods, pending their sale.

GENERAL DESCRIPTION

As is well known, many systems are in use for the automatic control of temperature. Some are used to so control heating plants as to maintain a desired temperature, while others are used to so control a refrigerating plant as to maintain a desired refrigerating temperature. Many of these regulating systems have proved to be fairly satisfactory from many standpoints.

Two facts, however, point to the desirability of manual control of heating and refrigerating plants in conjunction with an automatic system for signaling when the plant needs attention:

(1) The characteristics of many otherwise excellent heating and refrigerating plants are such that the plants do not perform well or economically under automatic control and need to be somewhat closely supervised, taking into account varying conditions, such as outside temperature, time of day, and so forth.

(2) The owners or operators of many plants are unwilling or unable, from an economic standpoint, to make the rather substantial expenditure required for the purchase and installation of an automatic regulation system, or else are unwilling to entrust the automatic regulating system with the control of the plant. Such owners or operators, therefore, prefer that the plants continue to be controlled manually.

When either of the two foregoing conditions obtains, a simple signaling system effective to call the attention of the operator or attendant to a temperature change is highly desirable.

It is a feature of my invention that the signaling system, while having no control over the heating or refrigerating plant, is so interconnected with the device through which the manual control is exercised that the signal calling attention to a temperature change in either direction is terminated when the necessary manual operation has been performed responsive to the signal.

Description of drawings

Referring to the drawings, comprising Figs. 1 to 6, they show embodiments of my invention in sufficient detail to enable those skilled in the signaling art to understand and make use of the same. More in particular.

Fig. 1 is a layout drawing showing the interrelation of the parts of the signaling system and the parts of the heating system;

Fig. 2 is a wiring diagram of the system of Fig. 1;

Fig. 3 is a schematic drawing intended to illustrate the circuit operation more clearly;

Fig. 4 is a schematic drawing of a similar system employing a pair of lamps instead of the buzzer of Figs. 1 to 3;

Fig. 5 is a schematic drawing of a system employing both a buzzer signal as in Figs. 1 to 3 and lamp signals as in Fig. 4; and Fig. 6 is a schematic drawing of the system of Figs. 1 to 3 modified for use in connection with a refrigeration installation.

DETAILED DESCRIPTION

The invention having been described generally, a detailed description will now be given. The disclosure in Figs. 1 to 3 will be considered first.

Figure 1:
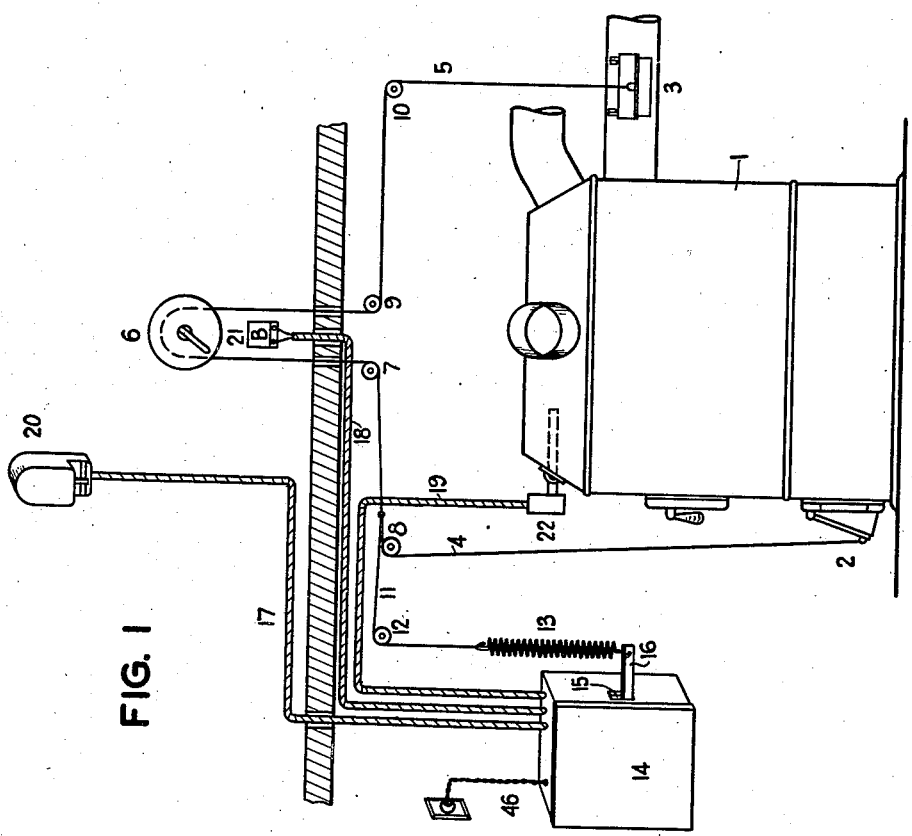

In Fig. 1, the warm-air furnace 1 may be of the usual coal-fired type having the usual draft door 2 and the usual check-draft door 3, each door being closed by gravity unless held open by the associated one of the draft chains 4 and 5. The furnace is illustrated as installed in the basement of a house, and is assumed to be connected by the usual cold-air and warm-air circulating pipes so as to heat the main part of the house.

The draft-control device 6 is of common construction, being illustrated in its normal, or draft-closed, position. In this position the draft door 2 is closed, and the check-draft door 3 is open to admit air to the draft pipe and thereby by-pass the heating plant and thus minimize fuel consumption.

When heat is desired, the draft-control device 6 is manually turned in a clockwise direction through an angle of about 270 degrees, pulling the chain 4 to open draft door 2, and releasing chain 5 to permit check-draft door 3 to close. Then when sufficient heat has been obtained, the the draft control 6 is restored to the position shown, permitting draft door 2 to close and again opening check-draft door 3. The pulleys 7 and 8 properly direct the pull of chain 4 against door 2. Pulleys 9 and 10 likewise direct the pull of chain 5 against the door 3.

Figure 2:
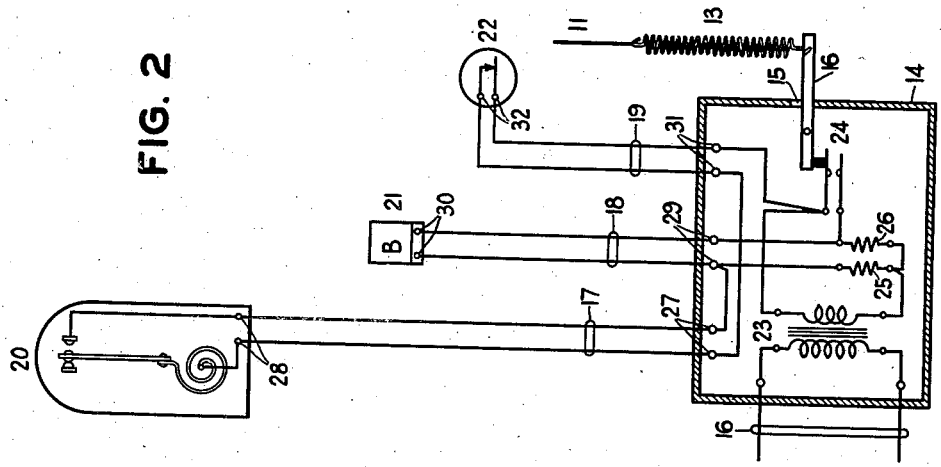
Figs. 1, 2, and 3 are different representations of an embodiment of the invention applied to a structure heated by a warm-air furnace.
Figure 3:
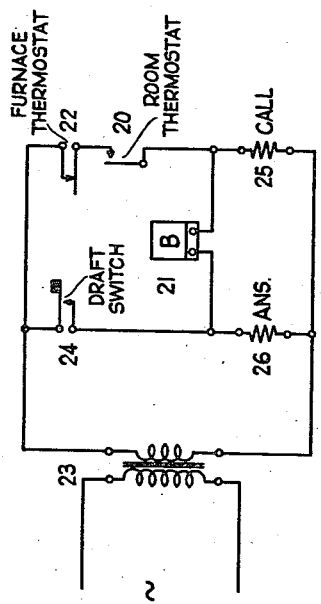

In Fig. 1, the room thermostat 20, of common construction, having temperature controlled contacts as indicated in Figs. 2 and 3, is mounted in a suitable location in the part of the house heated by the furnace 1, and may be adjusted to close its contacts responsive to a drop in temperature below a desired point, seventy degrees, Fahrenheit, for example, and to open its contacts when the temperature rises above the desired point. Thermostats commercially available operate reliably on a temperature differential of one or two degrees.

The furnace thermostat 22 is mounted with its bi-metallic control unit within the sheet-iron outer casing in the manner usual to temperature-control installations, and is adjustable to open its contacts, indicated in Figs. 2 and 3, when the heated-air temperature rises above a given point, 250 degrees Fahrenheit, for example, as when the room temperature is being brought up in the morning after being allowed to fall at night.

The switch-box 14, Fig. 1, contains apparatus as illustrated in Fig. 2. It is preferably mounted near the furnace so that the switch chain 11 may draw the switch bar 46 to alternate position when the draft door 2 is opened by chain 4. The pulley 12 directs the pull of chain 11 to the proper angle, while spring 13 permits further movement of the draft-chain system after switch-bar 16 has reached the limit of its movement allowed by slot 15.

The cord 16 supplies the usual alternating current to switch box 14 from an outlet box supplied from the usual house wiring.

Two-conductor cables 17, 18, and 19 connect switch-box 14 with the room thermostat 20, the buzzer 21, and the furnace thermostat 22, respectively.

Referring now particularly to Fig. 2, it will be noted that the switch-box 14, indicated diagrammatically, contains a step-down transformer 23, spring contacts 24 (closed when the right hand end of 16 is raised), resistors 25 and 26, and also terminals 27, 29, and 31, for cables 17, 18, and 19, respectively. Room thermostat 20, buzzer 21, and furnace thermostat 22 have terminals 28, 30, and 32 for the distant ends of cables 17, 18, and 19, respectively.

Room thermostat 20 is indicated as of the usual bi-metallic type having an iron contact tongue, with a small magnet to give snap action. The contacts are normally open, but the tongue moves to the right to close the contacts when the temperature drops below the desired point, returning to the left to open the contacts when the temperature rises above the desired point.

The buzzer 21 may be of the usual self-interrupting construction.

The furnace thermostat 22 has its contacts normally closed, but it is caused to open them when the heated air temperature rises above, say 220 degrees to 250 degrees, being, however, preferably adjustable, according to varying outside temperature.

Referring now particularly to Fig. 3, (a simplified schematic diagram of the circuit connections) it will be noted that two circuits, a call circuit and an answer circuit, are bridged across the terminals of the secondary winding of the transformer 23. The call circuit is normally open at the contacts of the room thermostat 20, while the answer circuit is normally open at the contacts 24 of the draft switch.

Operation

The operation of the system of Figs. 1 to 3 will now be explained. For this purpose it will be assumed that the temperature is at or above the desired point, so that the contacts of room thermostat 20 are open, and that the draft control 6 is in the position shown, so that the draft is shut off, and the draft switch 24 is therefore open.

Call for heat

When the room temperature falls below the desired point the contacts of thermostat 20 engage, closing the call circuit. The call circuit extends from the upper terminal of the secondary winding of transformer 23 through the closed contacts of furnace thermostat 22, the now-closed contacts of room thermostat 20, and the resistor 25 to the lower transformer terminal. The potential of the upper terminal of the secondary winding is thus impressed on the upper terminal of resistor 25. The buzzer 21, connected between the free or upper terminals of resistors 25 and 26 is now operated in parallel with resistor 25, and in series with resistor 26. The circuit of buzzer 21 may be referred to as a differential- or unbalance-detecting circuit.

Answering the call for heat

When the attendant hears the buzzer 21, he responds by rotating the control device 6, Fig. 1, in a clockwise direction, whereupon chain 4 opens draft door 2, while chain 5 permits check-draft door 3 to close. Chain 11 follows the pull of chain 4, acting through spring 13 to raise switch arm 16 to the upper end of slot 15 in switch box 14. Draft switch 24, Figs. 2 and 3, is closed by the movement of the pivoted arm 16.

With draft switch 24 closed, the answer resistor 26 is bridged across the secondary terminals of the transformer, in parallel with the call resistor 25. A balanced condition thus exists, and the operation of the buzzer is therefore terminated.

It is to be noted that both terminals of the buzzer 21 are now connected to the upper secondary lead of the transformer 23.

Terminating the call for heat

Assuming now that the heating of the furnace 1 responsive to the open-draft condition has raised the room temperature above the predetermined value, the tongue of the room thermostat 20 moves to the left, opening the thermostat contacts. The circuit through the call resistor 25 is thus opened, thereby terminating the call for heat.

Close-draft signal

The unbalance-detecting signal buzzer 21 is now sounded in parallel with answer resistor 26, and in series with call resistor 25, as a close-draft signal, calling the attention of the attendant to the fact that the draft should now be closed, as the temperature has now risen the desired amount.

Responding to the close-draft signal

Responsive to the close-draft signal of the buzzer 21, the attendant restores the draft-control device 6 to the position shown in Fig. 1, whereupon check-draft door 3 is opened by chain 5, while chain 4 permits draft door 2 to close.

The switch arm 16 may now restore by gravity and by the urge of the upper contact spring of draft-switch 24 (see Fig. 2). The contacts of draft switch 24 are thus allowed to open, deenergizing the answer resistor 26. With both resistors deenergized, the buzzer 21 ceases to operate.

Over-heat signal

In the event that the furnace temperature rises to the maximum desired value before the room temperature reaches the desired value, following the opening of the draft, the contacts of the furnace thermostat 22 are caused to separate, thus opening the call circuit to deenergize call resistor 25. This condition may arise when the temperature is being brought up, in the morning, for example. When this happens, buzzer 21 is actuated in parallel with answer resistor 26 (energized through switch 24) and in series with call resistor 25, just as though the room thermostat 20 had opened.

When the draft-control 6 is restored, the answer circuit is opened to still the buzzer 21.

Shortly, the checking of the draft allows the furnace to cool sufficiently to permit the contacts of the furnace thermostat 22 to close again. This again completes the call circuit (unless the room temperature has in the meantime risen sufficiently to secure an opening of the room thermostat). The buzzer 21 is thus sounded again to indicate that the draft should be opened again. With a brisk fire and fresh fuel in the furnace, the draft may need to be closed and opened two or more times in bringing the room temperature from, say, 60 degrees to 70 degrees without overheating the furnace or heating it so such an extent that the stored heat will drive the room temperature far above the desired point after the draft is closed.

Visual signaling

In the event that visual instead of audible signaling is desired, the buzzer 21 of Figs. 1 to 3 may be replaced by a suitable lamp, which becomes lighted at any time that the replaced buzzer would otherwise sound.

Figure 4:
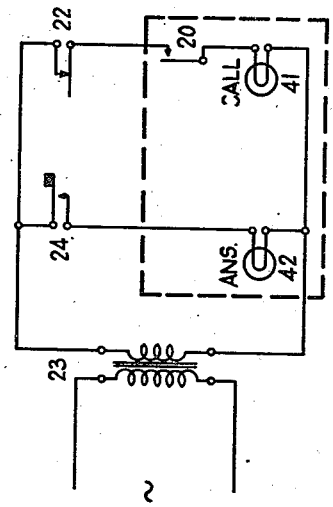
Figs. 4 and 5 are two desirable modifications of the system of Figs. 1, 2, and 3.

In Fig. 4, however, a specialized modification for lamp signaling is provided which is more economical of current in that the resistors 25 and 26 are replaced by lamps 41 and 42. When the call circuit through thermostats 20 and 22 is closed, call lamp 41 becomes lighted to indicate that the thermostat 20 is calling for heat. When the draft is opened, switch 24 closes a circuit for answer lamp 42, which lights to indicate that the call for heat has been answered.

Subsequently, the call lamp 41 is extinguished when the call circuit is opened by either of the thermostats (under the previously described conditions), indicating that the draft should be closed. When this indication is obeyed, the answer lamp is extinguished.

Combined visual and audible signaling

In the event that both visual and audible signaling are desired, the buzzer 21 of Figs. 1 to 3 may be shunted by a lamp, which lamp then lights as a visual signal whenever the buzzer sounds.

Figure 5:
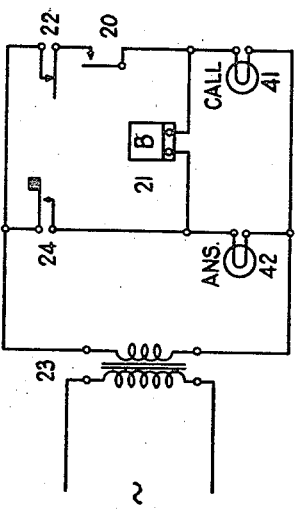

A more specialized circuit for combined visual and audible signaling is illustrated in Fig. 5, wherein the buzzer 21 is related to the lamps 41 and 42 so as to operate in the manner described in connection with Figs. 1 to 3, while the lamp signals operate as described in connection with Fig. 4. Briefly the buzzer 21, in Fig. 5, operates in parallel with either lamp which is lighted, and in series with the other, unless both are lighted, in which case it is quiescent.

Refrigeration signaling

Figure 6:
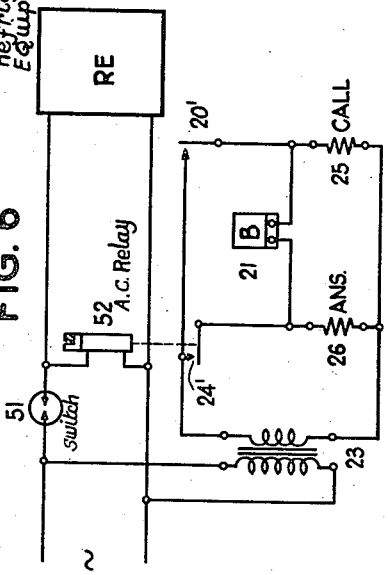
Fig. 6 shows the invention applied to a cold-storage or refrigerating plant.

Fig. 6 shows the signaling system modified to signal when refrigerating apparatus should be started and stopped.

The refrigerating apparatus, indicated by the rectangle RE, is started and stopped by the usual manual switch 51. The call circuit, through call resistor 25, is controlled by the thermostat 20', which closes its contacts responsive to a rise in temperature. The answer circuit, through answer resistor 26, is controlled by contacts 24' of shaded-pole a. c. relay 52, bridged across the conductors leading to RE.

When the temperature rises above the desired point, thermostat 20' closes, energizing call resistor 25. Buzzer 21 now operates in series with answer resistor 26.

When the attendant responds to the signal by closing the switch 51 to start refrigerating equipment RE, relay 52 responds by closing its contacts 24', energizing the answer circuit and thereby silencing the buzzer 21, as explained hereinbefore.

When the temperature has been brought below the predetermined point, thermostat 20' opens. This deenergizes call resistor 25, permitting buzzer 21 to operate in series with resistor 25 until relay 52 restores when the control switch 51 is opened.

It will be appreciated that the signaling arrangement of Fig. 6 may be modified as hereinbefore described to include visual signaling, either alone or in combination with audible signaling. The choice of the signaling means may be based upon many factors, such as desire for quietness, desire for specific information, etc.

It may be pointed out that thermostats, such as 20 and 20' are ordinarily constructed so that the working point may be readily adjusted between rather wide limits (twenty degrees, for example) so that a signal may be extinguished, or terminated, either by the performance of the indicated operation or by a slight readjustment of the thermostat, one or the other being done, depending upon the judgment of the attendant or user.

What I claim is:

1. In a signaling system, a call circuit and means for closing it responsive to a change in temperature, an answer circuit and voluntarily operable means for closing it following the closure of the call circuit, and a signal device and means for actuating it to give a signal which starts responsive to the closure of the call circuit and ends responsive to the closure of the answering circuit.

2. In a signaling system, a call circuit and means for closing it responsive to a change in temperature and for again opening it responsive to an opposite change in temperature, an answer circuit and means voluntarily operable for closing and opening it, a signal common to both circuits, means for operating said signal depending on either circuit being closed and also upon the other circuit being open at the same time.

3. In combination with a fuel-burning heating plant, a draft-control device having a draft-open position and a draft-closed position, a thermostat switch operable to open and to close its contacts responsive to variations in temperature caused by variable emission of heat from said plant, a second switch operable to open and to close its contacts responsive to said draft control device being shifted from one position to the other and from the other to the one, a signal controlled jointly by said switches to indicate when it is desirable to shift the position of said draft control device, and means including a source of current and circuit conductors so interconnecting the source of current with the signal and the said switches that the signal gives a positive indication whenever either switch is closed and the other is opened and gives a negative indication whenever both switches are open and also whenever both switches are closed.

4. In combination, a temperature responsive device having a position corresponding to a given temperature and another position corresponding to a different temperature, a temperature control device having one position in which it tends to cause the temperature to be raised and another in which it tends to cause the temperature to be lowered, two signal conductors interconnected with a current source in parallel relationship with each other, means for maintaining a branch circuit closed through one of said conductors and said current source depending upon said temperature responsive device being in a specific one of its said positions and independent of the position occupied by said control device, means for maintaining a similar circuit closed through the other conductor depending upon said control device being in a specific one of its said positions and independent of the position occupied by said responsive device, a signal device, and means for energizing said signal device depending upon the circuit through either conductor being open and the circuit through the other being closed.

5. In a signaling system, a current source, a pair of impedance devices connected in parallel with each other and across the terminals of the current source, two separately operable contact means connected in series with said impedance devices, respectively, each between the associated impedance device and a given terminal of the current source, and an indicating device connected between the impedance devices on the contact side thereof and operable in parallel with either and in series with the other when the corresponding contact means is closed and the other contact means is open.

6. In a draft-controlled heating system having a draft door, a thermostat having a contact pair which is maintained opened or closed according to temperature, a control switch comprising a contact pair which is maintained opened or closed depending upon whether the draft door of the heating system is opened or closed, a signal device, and means for operating it responsive to a closure of either contact pair when the other is open and also responsive to the opening of either contact pair when the other is closed.

JOHN I. BELLAMY.